No. 822,395. PATENTED JUNE 5, 1906.
E. L. SMITH & J. M. SHERRERD.
DREDGE CHAIN.
APPLICATION FILED JUNE 7, 1905.
2 SHEETS—SHEET 2.
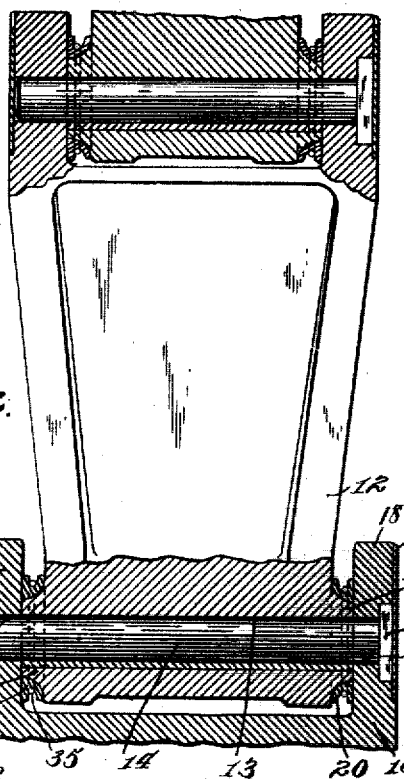
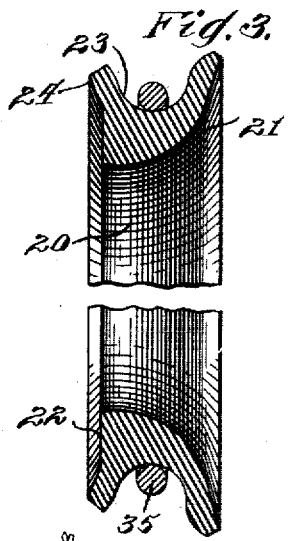
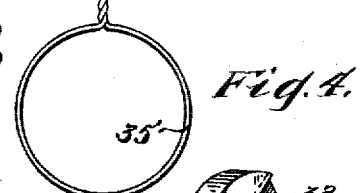
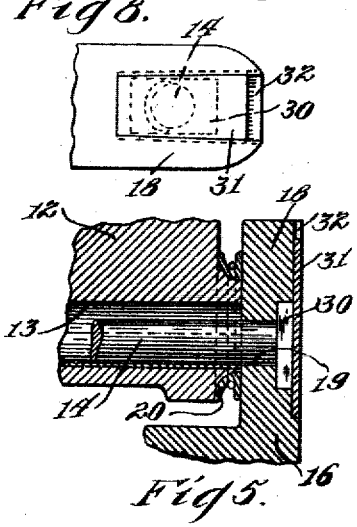
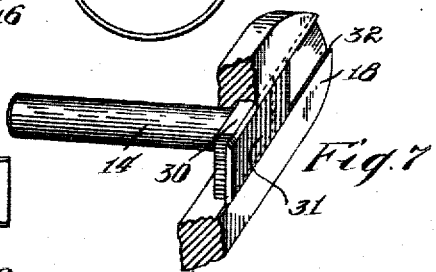
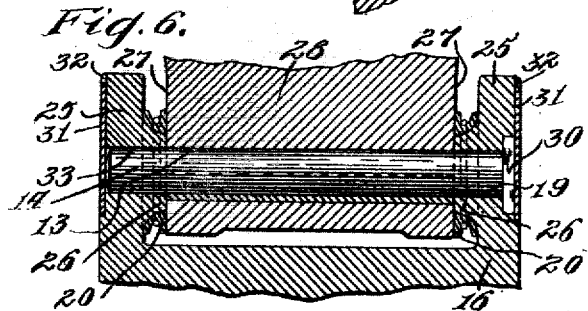
Witnesses:
C. G. Fuss
H. D. Penney
Inventors:
Edward L. Smith,
John M. Sherrerd,
By their attorney
F. H. Richards.

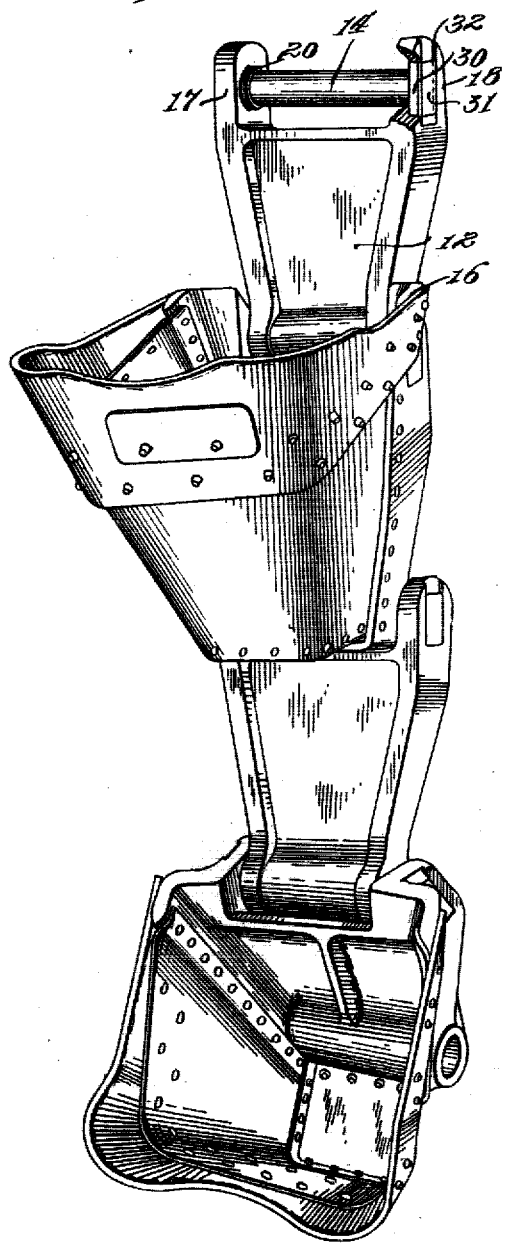

UNITED STATES PATENT OFFICE.

EDWARD L. SMITH, OF BRECKENRIDGE, COLORADO, AND JOHN M. SHERRERD, OF EASTON, PENNSYLVANIA.

DREDGE-CHAIN.

No. 822,395.　　Specification of Letters Patent.　　Patented June 5, 1906.

Application filed June 7, 1905. Serial No. 264,087.

*To all whom it may concern:*

Be it known that we, EDWARD L. SMITH, residing at Breckenridge, in the county of Summit and State of Colorado, and JOHN M. SHERRERD, residing at Easton, in the county of Northampton and State of Pennsylvania, citizens of the United States, have invented certain new and useful Improvements in Dredge-Chains, of which the following is a specification.

This invention has reference to the articulations of various chain devices, especially to the dredge-chains provided with buckets or scoops on the links of the chain, which is formed continuous and operated as a conveyer for dredging, excavating, and similar purposes.

It is an object of the invention to provide improved means for preventing access of the dirt or other material operated upon to the members of the joints that are relatively movable to prevent abrasion and undue friction at such places, and such means are especially applicable where the dredge is used with wet material or for excavating the ground at the bottom of a body of water.

A further object of the invention is to provide a form of covering means that will entirely close the aperture made in the link members for the pivotal pin on the outer faces of the member.

Another object of the invention is to provide an improved form of gasket or packing-ring that is placed between the opposing movable faces of two members that are articulated.

In the drawings accompanying and forming a part of this specification, Figure 1 shows in perspective a dredge-chain with our improved form of closing device for the pivot-apertures and also our improved form of gasket. Fig. 2 shows a longitudinal section, partly broken, through a link and a bucket jointed therewith. Fig. 3 shows a gasket and inclosing ring in transverse broken section. Fig. 4 is a view of the inclosing ring separate. Fig. 5 is a fragmentary view of the parts shown in Fig. 2, illustrating the enlargement of the pivot-aperture by continued wear and consequent displacement of the several parts relatively caused thereby. Fig. 6 is a view similar to Fig. 2, with a reversal of certain parts. Fig. 7 shows in perspective the plate closing the aperture for the pivot-pin. Fig. 8 is an end elevation of the same parts, and Fig. 9 shows a side elevation and also an end view of the plate closing the opening for the pivot-pin.

Referring now to the drawings, the link 12 has at one end a transverse bore 13 for the insertion of the bearing-pin 14, and at each of the opposite sides of the link is arranged a boss 15, concentric with the aperture 13. The periphery of each boss is preferably made converging outwardly and is shown of a curved form, preferably made concavely converging. The member of the chain articulated to this link, which may be shovel member 16, is shown as having the usual projecting parts 17 18 at the opposite sides of one end. These parts have apertures 33 19 of a size to permit insertion of the pin or bolt 14, that pivots the members together.

From Figs. 2 and 5 it will be seen that the end of each boss engages a plane inner face of the piece 17 or 18 and that no bosses are formed on these pieces.

Each boss will offset the link from the adjacent piece, in which space is placed a gasket or packing-ring 20. (Shown separately in Fig. 3.) This gasket has its inner face or side 21 preferably of a shape corresponding with the periphery of the boss 15. Hence in the present instance such inner face will be substantially of a concavely-tapering contour. The outer portion of this curved face will form substantially one side of the gasket engaging the base or larger portion of the boss. The other side of the gasket will have a bearing against the plane face of the piece 17 or 18, and therefore will be arranged substantially transverse to the axis of the gasket, as shown at 22 in Fig. 3.

The outer face or periphery of the gasket contains a groove 23 and is substantially U-shaped in section. The outer portion of the periphery adjacent the plane side 22 is preferably extended outward at 24, for the reason that when the gasket is placed on the boss, as shown in Figs. 2 and 5, this portion of it will be bent inward, and hence react to press against the plane face of the piece 17 or 18. It is found desirable to place a suitable clamp in the groove 23, which may consist of a wire or rod 35, passed around the curve, with the end portions twisted or secured, as indicated in Fig. 4. This will have the effect of wedging the gasket in the substantially angular space between the periphery of the gasket and the adjacent piece, effectually preventing the admission of dirt or sand to the bearing-surfaces. One of these bosses 15 is placed on each side of the link 12, which extend outward, and a gasket is placed on each boss, being in reversed position, as shown in Fig. 2.

In Fig. 5 is shown one effect of the abrasion of the bore 13 in the link 12 by the bolt 14. This will cause a change of the position of the link and piece 17 relatively, and hence the boss will engage a different portion of the plane face of the piece 17, and the same applies to the gasket 20, that will obviously change its position relative to the pieces 17 or 18; but since the engaging face of the piece 16, with the side of the gasket 14, is a plane surface there will be no distortion of the gasket or any displacement of it tending to effect unequal wear and destructive results.

In Fig. 6 is shown an arrangement similar to Fig. 2; but in this instance the side pieces 25 are provided with bosses 26 similar to the aforesaid bosses 15, that project inward from the inner face of each of the pieces 25, and the outer faces 27 of the link 28 are made to extend in a plane perpendicularly with the pivot-pin 14. The bosses 26 are surrounded by the same form of gasket 21, but in this instance reversed in position, with its plane face disposed inward, in engagement with the outer plane face of the link. It will be at once seen that the circumstances are substantially identical with the form shown in Fig. 2, and hence the same advantageous results will accrue from such modified construction.

The pivotal pin or bolt 14 extends substantially through the apertures in the pieces 17 and 18, and one at least of these apertures must be uncovered for the insertion of the pin therein. This pin is frequently provided with a rectangular head 30, and a correspondingly-shaped enlargement of the aperture must be formed in the piece 18 to provide a socket for such head. The aperture in the piece 17 for the other extremity of the pin may not pass entirely through—that is, may consist of a socket if preferred; but since such socket must be drilled from the inner face it is preferable to form an aperture through the piece. At each end of the pin is thereby formed a space where dirt or sand, and especially fine mud, can enter between the contacting surfaces and reach the bearing-surfaces of the joint. We provide a member at one or preferably both of the outer extremities of such aperture. In the drawings this cover is shown as composed of a plate 31, having its edges beveled—that is, dovetailed in transverse section. A correspondingly-shaped channel or slot 32 is formed in the outer face of each piece 17 and 18, whose opposite side walls are undercut, thereby preventing the outward movement of the plate 31, that is slid in such slot. The plate is formed of a width slightly greater than the head or extremity of the pin 14, and the slot is arranged to intersect the aperture for the pin 14, so that the insertion of the plate a sufficient distance will entirely cover or close the opening into the piece 16 and prevent the admission of foreign particles thereto. The plate 31 may be suitably locked in such position and is preferably made with the beveled sides slightly converging or tapered, and the engaging walls of the slot are similarly formed, so that when the plate is inserted in the slot and forced to its proper position it will be tightly wedged between the side walls, and thereby retained in such position.

It will be thus seen that it is practically impossible for any dust or mud to work its way into the bearing-surfaces of the joint, since the gasket 20 will effectually prevent the dirt from entering between the movable surfaces of the joint, while the plate 31 will entirely prevent admission of any foreign particles around the ends of the pivot-pin.

The gasket 21 is preferably formed of soft rubber; but it may be constructed of any suitable packing material, either non-metallic or of any desired form of metallic packing composition.

Having thus described our invention, we claim—

1. In a pivot-joint, an apertured member, a second member, a pivot on the second member extending into the apertured part of the other member, one of the members having a boss around the pivot and extending into contact with the other member, the boss having its periphery concavely converging toward the other member, the other member having its face engaged by such boss extending in a plane at right angles to the pivot, and a gasket surrounding said boss and having its inner boss-engaging surface concavely converging corresponding to the periphery of the boss.

2. In a pivot-joint, an apertured member, a second member, a pivot on the second member extending into the apertured part of the other member, one of the members having a boss around the pivot and extending into contact with the other member, the other member having its face engaged by the boss extending in a plane at right angles to the pivot, and a gasket surrounding said boss and having its periphery grooved, and a clamping member located in said grooved portion of the gasket.

3. In a pivot-joint, an apertured member, a second member, a pivot on the second member extending into the apertured part of the other member, one of the members having a boss around the pivot and extending into contact with the other member, the boss having its periphery converging toward the other member, the other member having its face engaged by the boss extending in a plane at right angles to the pivot, a gasket surrounding said boss and having its inner boss-engaging surface converging corresponding to the periphery of the boss, the gasket having its periphery grooved, and a clamping member located in said grooved portion of the gasket.

4. The combination with pivoted members having a converging boss on one member offsetting the other member, of a resilient gasket having its periphery grooved, and having one side face converging corresponding to the boss, the other side face being transverse to the pivot from the inner edge outward, but flared away from the grooved portion at the outer part, and a clamping member located in the groove retaining the gasket in position with the flared portion bent inward and snugly engaging the adjacent member.

5. In a pivot-joint, an apertured member, a second member, a pivot on the second member extending into the apertured part of the other member, one of the members having a boss around the pivot and extending into contact with the other member, the boss having its periphery converging toward the other member, the other member having its face engaged by such boss extending in a plane at right angles to the pivot, a resilient gasket surrounding said boss and having its inner boss-engaging surface converging corresponding to the periphery of the boss, and a clamping member engaging the periphery of the gasket at its intermediate portion only.

6. In a pivot-joint, an apertured member, a second member, a pivot on the second member extending into the apertured part of the other member, one of the members having a boss around the pivot and extending into contact with the other member, the boss having its periphery converging toward the other member, the other member having its face engaged by the boss extending in a plane at right angles to the pivot, a resilient gasket surrounding said boss and having its inner boss-engaging surface converging corresponding to the periphery of the boss, and having a substantially plane side face engaging the plane face of said member, and a clamping member engaging the periphery of the gasket at its intermediate portion only.

7. In a chain, a link having at one end a part projecting from each side, a second link extending between said parts, each of said parts being pivoted to the adjacent portion of the second link by means of a pivot on one link extending into an apertured portion of the other link, one of such links at each said joint having a boss around the pivot on one face and extending into contact with the other link, the other link at each said joint having its face engaged by the boss extending in a plane at right angles to the pivot, a gasket surrounding each such boss and having its periphery grooved, and a clamping member located in the grooved part of the gasket.

8. In a chain, a link having at one end an apertured part projecting from each side, a second link extending between said parts and having an aperture registering with said apertures, a pivot extending through said apertured parts thereby articulating the links, one of the links at each joint having a boss around the pivot and extending into contact with the other link, each boss having its periphery concavely converging toward the other link and a gasket surrounding each boss and having its inner boss-engaging surfaces concavely converging corresponding to the periphery of the boss.

9. In a chain, a link having at one end a part projecting from each side, a second link extending between said parts, each of said parts being pivoted to the adjacent portion of the second link by means of a pivot on one link extending into an apertured portion of the other link, the second link at each side joint having a boss around the pivot on one face and extending into contact with the other link, the other link at each said joint having its face engaged by the boss extending in a plane at right angles to the pivot, a gasket surrounding each such boss and having its periphery grooved, and a clamping member located in the grooved part of the gasket.

10. In a chain, a link having at one end an apertured part projecting from each side, a second link extending between said parts and having an aperture registering with said apertures, a pivot extending through said apertured parts thereby articulating the links, the second link at each joint having a boss around the pivot and extending into contact with the other link, each boss having its periphery concavely converging toward the other link, and a gasket surrounding each boss and having its inner boss-engaging surface concavely converging corresponding to the periphery of the boss.

11. In a chain, a link member having at one end an apertured part projecting from each side, a second link member extending between said parts and having an aperture registering with said apertures, a pivot extending through said apertured parts thereby articulating the links, one of the links at each joint having a boss around the pivot extending into contact with the other link, each boss having its periphery concavely converging toward the other link, the other link having its face engaged by each said boss extending in a plane at right angles to the pivot, and a gasket surrounding each said boss and having its inner boss-engaging surface concavely converging corresponding to the periphery of the boss, and having its periphery grooved, and a clamping member located in such grooved parts of the gaskets.

12. In a chain, a member having a transverse aperture, a pivot in such aperture projecting beyond each side, a second member articulated with such member by having two apertured parts, each engaging one of said pivot end portions, the said parts each having a slot on the outer face intersecting such aperture, and a plate secured in each such slot and entirely covering the aperture at that end.

13. In a chain, a member having a transverse aperture, a pivot in such aperture projecting beyond each side, a second member articulated with such member by having two apertured parts, each engaging one of said pivot end portions, a slot in the outer face of each said part intersecting said aperture, the opposite side walls of the slot being undercut, and a plate having inclined side faces and arranged to fit into each said slot and thereby entirely cover each said aperture.

14. In a chain, a member having a transverse aperture, a pivot in such aperture projecting beyond each side, a second member articulated with such member by having two apertured parts, each engaging one of said pivot end portions, a slot in the outer face of each said part intersecting said aperture, the opposite side walls of the slot being undercut, and a plate having inclined side faces and arranged to fit into said slot and thereby entirely cover each said aperture, each slot having the side walls arranged converging, and each plate having its inclined sides correspondingly converging, whereby the plate can be wedged in such slotted face of the plate.

15. A member having an aperture, a rod or bolt extending into such aperture from one side of the member, and a plate slidably attached to the other side of the member and entirely covering such aperture.

16. A member having an aperture, a rod or bolt extending into such aperture from one side of the member, the member having a slot on the opposite face intersecting such aperture, and a plate secured in such slot and entirely covering the aperture.

17. A member having an aperture, a rod or bolt extending into such aperture from one side of the member, a slot in the opposite face of the member intersecting said aperture, the opposite side walls of the slot being undercut, and a plate having inclined side faces and arranged to fit into such slot and thereby entirely cover such aperture.

18. A member having an aperture, a rod or bolt extending into such aperture from one side of the member, a slot in the opposite face of the member intersecting said aperture, the opposite side walls of the slot being undercut, and a plate having inclined side faces and arranged to fit into such slot and thereby entirely cover such aperture the slot having the side walls arranged converging, and said plate having its inclined sides correspondingly converging, whereby the plate can be wedged in such slotted face of the member.

EDWARD L. SMITH.
JOHN M. SHERRERD.

Witnesses:
E. B. Coss,
F. T. Cramer.